US012791093B2

(12) United States Patent
Lee et al.

(10) Patent No.: US 12,791,093 B2
(45) Date of Patent: Nov. 10, 2026

(54) DRIVING DEVICE LUBRICATION STRUCTURE

(71) Applicants: HYUNDAI MOTOR COMPANY, Seoul (KR); KIA CORPORATION, Seoul (KR)

(72) Inventors: Yeo Hae Lee, Hwaseong-si (KR); Dae In Lee, Gyeonggi-do (KR); Woo Hyun Lim, Gyeonggi-do (KR); Kyoung Chul Min, Gyeonggi-do (KR); Jong Sool Park, Gyeonggi-do (KR); Kyung Won Suh, Gyeonggi-do (KR); Ki Seok Kim, Gyeonggi-do (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 17 days.

(21) Appl. No.: 18/938,661

(22) Filed: Nov. 6, 2024

(65) Prior Publication Data

US 2026/0002586 A1 Jan. 1, 2026

(30) Foreign Application Priority Data

Jul. 1, 2024 (KR) ........................ 10-2024-0086246

(51) Int. Cl.
*F16H 57/04* (2010.01)

(52) U.S. Cl.
CPC ....... *F16H 57/0443* (2013.01); *F16H 57/045* (2013.01); *F16H 57/0404* (2013.01)

(58) Field of Classification Search
CPC ...... F16H 57/0443; F16H 57/045; F16N 7/38; F16N 7/385; F16N 7/40
See application file for complete search history.

(56) References Cited

U.S. PATENT DOCUMENTS

| | | | | |
|---|---|---|---|---|
| 5,662,188 | A * | 9/1997 | Ito | B62D 5/07 184/6.12 |
| 11,571,966 | B1 * | 2/2023 | Park | B60K 17/046 |
| 11,639,101 | B1 * | 5/2023 | Park | F16H 1/26 475/346 |
| 11,938,809 | B2 * | 3/2024 | Park | F16H 37/12 |
| 11,994,113 | B2 * | 5/2024 | Pedersen | F16N 29/02 |
| 12,241,525 | B1 * | 3/2025 | Lim | F16H 1/2827 |
| 12,253,000 | B2 * | 3/2025 | Williams | F02C 7/36 |
| 12,258,904 | B2 * | 3/2025 | Turnquist | F02C 6/08 |

(Continued)

*Primary Examiner* — Minh Truong
(74) *Attorney, Agent, or Firm* — MCDONNELL BOEHNEN HULBERT & BERGHOFF LLP

(57) ABSTRACT

Proposed is a driving device lubrication structure. The driving device lubrication structure includes a main body, a sub-body configured to perform a relative movement with multiple degrees of freedom with respect to the main body within a predetermined range and configured such that at least a portion of the sub-body is capable of being rotated by a rotational force transmitted from the main body, a driving device provided within the sub-body and configured to shift the rotational force, an oil pump provided in the main body and configured to supply oil to the driving device, a supply pipe mounted such that oil that the oil pump supplies can be supplied to the sub-body while the relative movement can be performed, and a return pipe configured such that oil in the sub-body is capable of being returned to the oil pump while the relative movement can be performed.

13 Claims, 15 Drawing Sheets

(56) References Cited

U.S. PATENT DOCUMENTS

| | | | | |
|---|---|---|---|---|
| 12,326,161 | B1 * | 6/2025 | Holland | F15B 21/041 |
| 2007/0068735 | A1 * | 3/2007 | Mori | B60K 17/046<br>184/6.12 |
| 2010/0332089 | A1 * | 12/2010 | Gianone | F16H 57/0447<br>701/51 |
| 2013/0057048 | A1 * | 3/2013 | Ishikawa | B60L 7/24<br>301/6.5 |
| 2014/0041619 | A1 * | 2/2014 | Yamauchi | F16H 57/0486<br>123/196 R |
| 2017/0234158 | A1 * | 8/2017 | Savela | F01D 25/164<br>416/1 |
| 2019/0128401 | A1 * | 5/2019 | Hayes | F16H 57/0483 |
| 2020/0003277 | A1 * | 1/2020 | Sardes | F16H 1/20 |
| 2020/0284195 | A1 * | 9/2020 | Gebhard | F02C 7/36 |
| 2025/0164005 | A1 * | 5/2025 | Suzuki | F16H 57/04 |

* cited by examiner

DRIVING DEVICE LUBRICATION STRUCTURE

CROSS-REFERENCE TO RELATED APPLICATION

The present application claims priority to Korean Patent Application No. 10-2024-0086246, filed Jul. 1, 2024, the entire contents of which are incorporated herein for all purposes by this reference.

TECHNICAL FIELD

The present disclosure relates to a technology for lubricating a driving device such as a vehicle.

BACKGROUND

A vehicle is driven by a rotation of a wheel having multiple degrees of freedom with respect to a vehicle body.

A rotational force of the wheel is provided from a power source such as a motor or an engine, and the rotational force provided by the power source acts as a rotational force of the wheel after gear shifting is performed in a driving device.

When a driving device capable of changing a rotational force provided by a power source is provided in a wheel, proper lubrication of the driving device provided in the wheel is required to be continuously performed.

Meanwhile, since it is advantageous that a vehicle has a small unsprung mass, it is preferable that the amount of oil in the wheel is as small as possible within a range that guarantees sufficient lubricating performance of the driving device.

For reference, here, the "driving device" is used to include components that transmit the rotational force provided by the power source to the final rotation body such as a wheel, so that the "driving device" may be interpreted to include components used for deceleration or gear shifting.

The foregoing is intended merely to aid in the understanding of the background of the present disclosure and is not intended to mean that the present disclosure falls within the purview of the related art that is already known to those skilled in the art.

SUMMARY

An objective of the present disclosure is to provide a driving device lubrication structure capable of minimizing the unsprung mass by minimizing the mass of a wheel as much as possible and also capable of realizing a sufficient lubrication in a driving device in the wheel when the driving device that is required to be lubricated is mounted inside the wheel coupled to a vehicle body such that the wheel is capable of performing a relative movement with multiple degrees of freedom with respect to the vehicle body.

In order to achieve the objectives of the present disclosure, there is provided a driving device lubrication structure including a main body, a sub-body mounted such that the sub-body is capable of performing a relative movement with multiple degrees of freedom with respect to the main body within a predetermined range and the sub-body being configured such that at least a portion of the sub-body is capable of being rotated by a rotational force transmitted from the main body. The driving device lubrication structure also includes a driving device provided within the sub-body, the driving device being configured to shift the rotational force transmitted from the main body, an oil pump provided in the main body and configured to supply oil to the driving device, a supply pipe mounted such that oil that the oil pump supplies is capable of being supplied to the sub-body while the relative movement of the sub-body with respect to the main body is capable of being performed, and a return pipe configured such that oil in the sub-body is capable of being returned to the oil pump while the relative movement of the sub-body with respect to the main body is capable of being performed.

The supply pipe may be mounted such that the supply pipe connects the oil pump and the sub-body to each other at a position relatively higher than a position of the return pipe.

The main body may be provided with a reservoir such that the reservoir is capable of being in communication with the supply pipe, and a control valve capable of controlling a flow of oil may be provided between the reservoir and the supply pipe.

A pressure spring may be mounted in the reservoir so that pressure is capable of being applied to oil accommodated in the reservoir.

At least one of the main body and the sub-body may be provided with a sensor capable of measuring a movement state, and a controller configured to perform a control such that the control valve is opened and oil is supplied to the sub-body when the controller receives a signal from the sensor and determines that there is a possibility of exposure of an inlet of the return pipe to air.

In a situation of turning or uphill and downhill driving of the main body and the sub-body or in a situation in which the sub-body is raised to a position where the inlet of the return pipe is positioned higher than a position of an outlet of the return pipe, the controller may be configured to determine that at least one of the situations as a case in which there is the possibility of exposure of the inlet of the return pipe to air.

The main body may be a vehicle body, the sub-body may be mounted such that the sub-body is capable of performing the relative movement with multiple degrees of freedom with respect to the vehicle body through a suspension device, and the sub-body may be provided with a wheel that is configured to be rotated by receiving a rotational force transmitted from the vehicle body through the driving device.

A check valve that prevents oil from flowing back toward the sub-body may be provided at an inlet of the return pipe.

An oil filter may be provided at a suction side of the oil pump, and the return pipe may be mounted such that oil is capable of being returned to the oil pump through the oil filter.

The supply pipe and the return pipe may be respectively formed of flexible hoses connecting the main body and the sub-body to each other.

The sub-body may include a carrier mounted such that the carrier is capable of performing a relative movement with multiple degrees of freedom with respect to the main body, the carrier constituting the driving device, and a wheel mounted such that the wheel is capable of being rotated with respect to the carrier by a rotational force transmitted from the driving device.

The driving device may include a ring gear which is mounted such that the ring gear is capable of being rotated with respect to the carrier and to which the wheel is connected, a sun gear configured to receive a rotational force transmitted from the main body and mounted such that a distance between a rotation shaft of the sun gear and a rotation shaft of the ring gear is capable of being changed, and a gear train provided such that a continuous power transmission state between the sun gear and the ring gear is maintained while the gear train allows the change in the distance between the rotation shaft of the sun gear and the rotation shaft of the ring gear. Furthermore, among gears constituting the gear train, a rotation shaft of a final gear that is engaged with the ring gear may be supported on the carrier.

The gear train may be provided with a plurality of links configured such that an angle at which the plurality of links is connected to each other is changed according to a relative movement between the rotation shaft of the sun gear and the rotation shaft of the ring gear.

The plurality of links may include a first link connected to the rotation shaft of the sun gear and includes a second link connected to the first link, and a joint gear which constitutes the gear train and which has the same number of teeth as the sun gear and the final gear may be mounted at a connection portion between the first link and the second link.

The gear train may include a first intermediate gear having a rotation shaft supported on the first link such that the first intermediate gear connects the sun gear and the joint gear to each other, and a second intermediate gear having a rotation shaft supported on the second link such that the second intermediate gear connects the joint gear and the final gear to each other.

The supply pipe and the return pipe may be mounted such that the supply pipe and the return pipe are in communication with a space inside a carrier housing that surrounds the carrier and the ring gear, and a wheel hub to which the wheel is coupled may be spline-coupled to the ring gear, and the wheel hub may be supported on the carrier housing by a wheel bearing.

In the present disclosure, when the driving device that is required to be lubricated is mounted inside the wheel coupled to the vehicle body such that the wheel is capable of performing the relative movement with multiple degrees of freedom with respect to the vehicle body, the driving device lubrication structure is capable of minimizing the unsprung mass by minimizing the mass of the wheel as much as possible, and the driving device lubrication structure is also capable of realizing a sufficient lubrication in the driving device in the wheel.

BRIEF DESCRIPTION OF THE DRAWINGS

The above and other objectives, features, and other advantages of the present disclosure will be more clearly understood from the following detailed description when taken in conjunction with the accompanying drawings.

DETAILED DESCRIPTION

Figure 1:
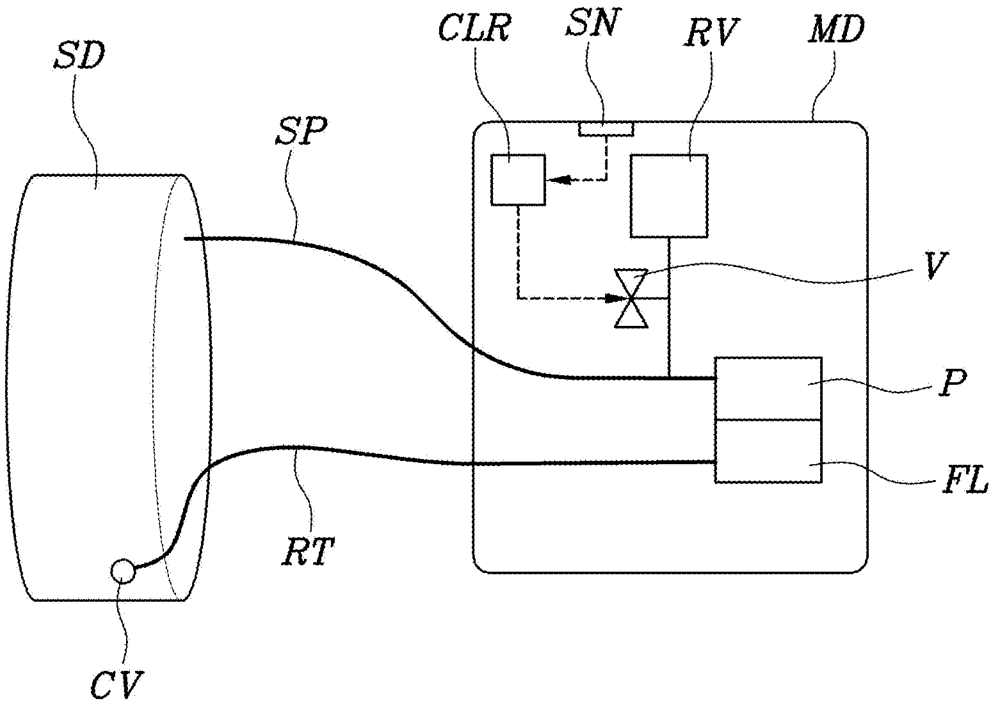
FIG. 1 is a view illustrating a driving device lubrication structure according to the present disclosure.

Hereinafter, exemplary embodiments disclosed in the present specification will be described in detail with reference to the accompanying drawings. In the present specification, the same or similar components will be denoted by the same or similar reference numerals, and a repeated description thereof will be omitted.

In the following description, the expressions "module" and "part" contained in terms of constituent elements to be described will be selected or used together in consideration only of the convenience of writing the following specification, and the expressions "module" and "part" do not necessarily have different meanings or roles.

Detailed description of known technologies will be omitted if it is determined that the detailed description of the known technologies obscures the embodiments of the present specification. In addition, the accompanying drawings are merely intended to easily describe the embodiments of the present specification, but the spirit and technical scope of the present specification is not limited by the accompanying drawings. It should be understood that the present specification is not limited to specific disclosed embodiments, but includes all modifications, equivalents and substitutes included within the spirit and technical scope of the present disclosure.

Terms including ordinals such as "first" or "second" used herein may be used to describe various elements, but the elements are not limited by the terms. The terms are used only for the purpose of distinguishing one constituent element from another constituent element.

When a component is referred to as being "connected" or "contacted" to another component, it should be understood that it may be directly connected or contacted to the other component, but other components may exist therebetween. On the other hand, when a component is referred to as being "directly connected" or "directly contacted" to another component, it should be understood that there is no other component therebetween.

Singular expressions include plural expressions unless the context clearly indicates otherwise.

It is to be understood that terms such as "including" and "having" are intended to indicate the existence of the features, numbers, steps, actions, elements, components, or combinations thereof disclosed in the specification, and are not intended to preclude the possibility that one or more other features, numbers, steps, actions, elements, components, or combinations thereof may exist or may be added.

Referring to FIGS. 1 to 15, a driving device D lubrication structure according to an embodiment of the present disclosure includes a main body MD, and a sub-body SD mounted such that the sub-body SD is capable of performing a relative movement with multiple degrees of freedom with respect to the main body MD within a predetermined range, the sub-body SD being configured such that at least a portion of the sub-body SD is capable of being rotated by a rotational force transmitted from the main body MD. The driving device D lubrication structure also includes the driving device D provided within the sub-body SD, the driving device D being configured to shift the rotational force transmitted from the main body MD. The driving device D lubrication structure further includes an oil pump P provided in the main body MD and configured to supply oil to the driving device D, a supply pipe SP mounted such that the oil that the oil pump P supplies is capable of being supplied to the sub-body SD while the relative movement of the sub-body SD with respect to the main body MD is capable of being performed, and a return pipe RT configured such that the oil in the sub-body SD is capable of being returned to the oil pump P while the relative movement of the sub-body SD with respect to the main body MD is capable of being performed.

In the present disclosure, in a state in which the sub-body SD provided with the driving device D required for lubrication is spaced apart from the main body MID provided with the oil pump P such that the sub-body SD is capable of performing the relative movement with multiple degrees of freedom with respect to the main body MD, oil required for the driving device D is capable of being stably supplied through the supply pipe SP to the sub-body SD and also an excessive amount of oil is not stored and the excessive amount of oil is capable of being recovered through the return pipe RT, so that the mass of the sub-body SD is capable of being kept to a minimum and churning loss of oil is capable of being reduced.

The supply pipe SP is mounted such that the supply pipe SP connects the oil pump P and the sub-body SD to each other at a position relatively higher than a position of the return pipe RT.

That is, the supply pipe SP is configured to supply oil from the oil pump P to an upper side of the sub-body SD, so that the oil is capable of smoothly lubricating the driving device D by pressure and the weight of the oil. Furthermore, the oil that has completed lubrication is collected to a lower side of the sub-body SD, and is collected through the return pipe RT.

The main body MD is provided with a reservoir RV capable of being in communication with the supply pipe SP, and a control valve V capable of controlling the flow of oil is provided between the reservoir RV and the supply pipe SP.

Figure 4:
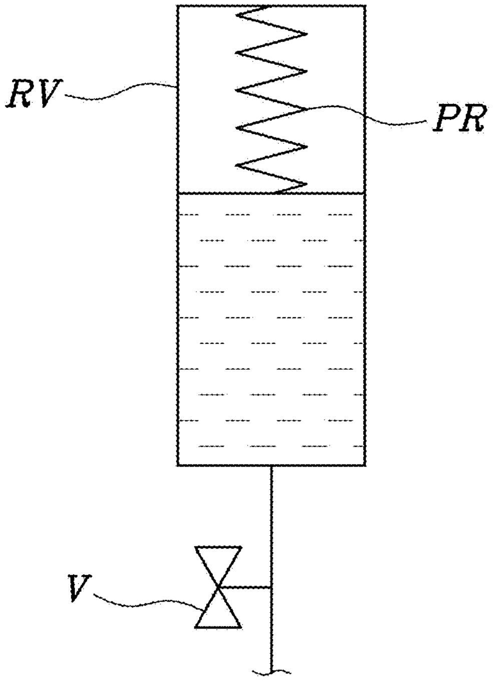
FIG. 4 is a view illustrating a reservoir in FIG. 1.

In addition, as illustrated in FIG. 4, a pressure spring PR may be mounted inside the reservoir RV so that pressure is capable of being applied to the oil accommodated in the reservoir RV.

Therefore, in a situation in which the oil pump P is driven, when the control valve V is opened, oil is accommodated inside the reservoir RV. Furthermore, in a situation in which the oil pump P is not driven, when the control valve V is opened, the oil accommodated in the reservoir RV may be supplied to the sub-body SD through the supply pipe SP by an elastic force of the pressure spring PR.

Of course, in a state in which the oil pump P is driven and the control valve V is opened, oil is supplied to the inside of the reservoir RV, and oil is supplied directly from the oil pump P to the sub-body SD.

Meanwhile, a check valve CV that prevents oil from flowing back toward the sub-body SD is provided at an inlet of the return pipe RT.

Figure 9:
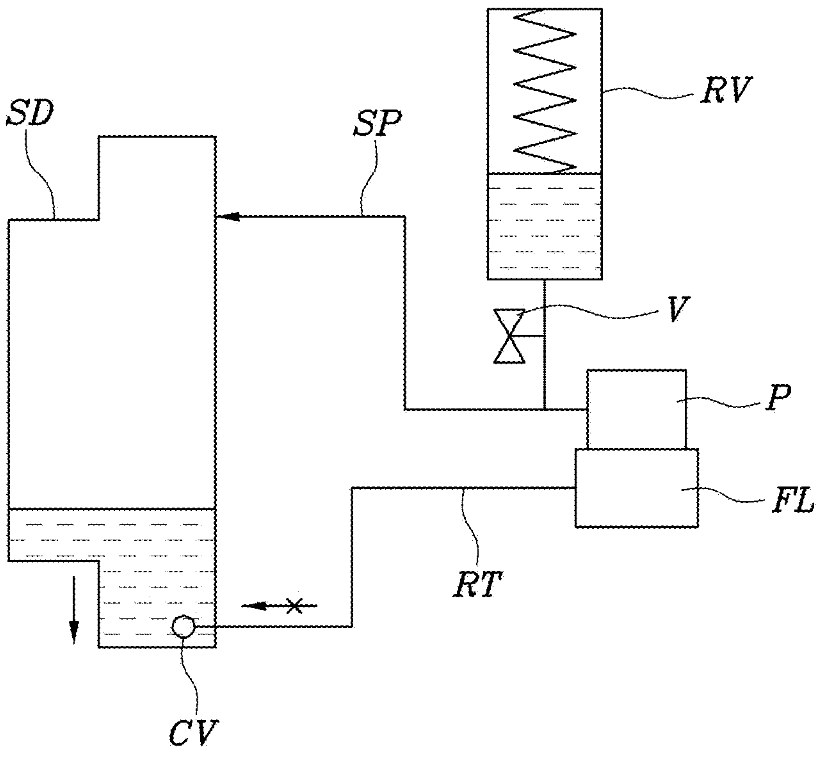
FIG. 9 is a view illustrating the state in which backflow of oil through a return pipe is prevented by a check valve in a situation in which the wheel of the vehicle is lowered with respect to the vehicle body.
Figure 10:
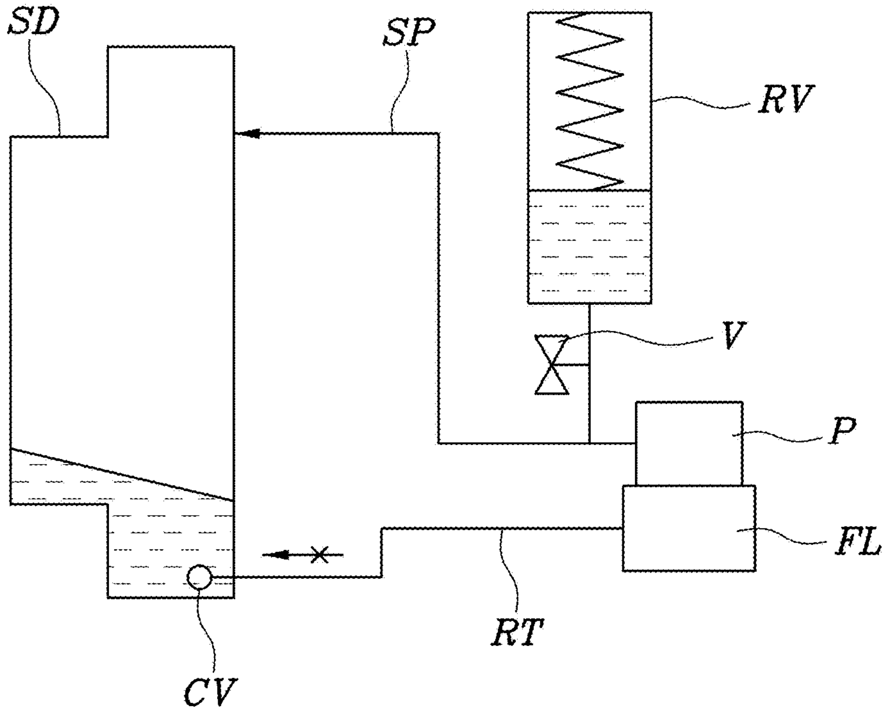
FIG. 10 is a view illustrating a state in which backflow of oil through the return pipe is prevented by the check valve during turning of the vehicle.
Figure 11:
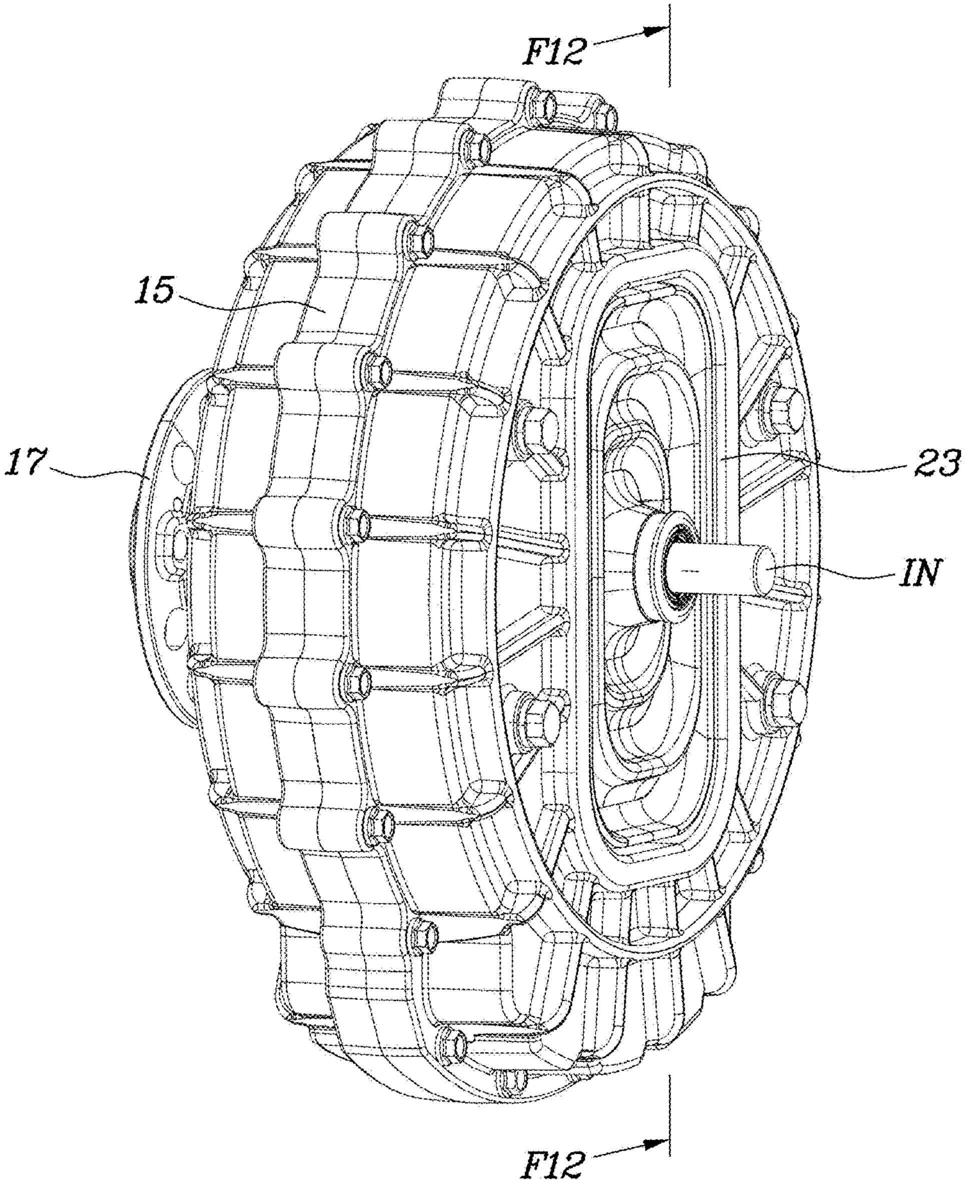
FIG. 11 is a view illustrating a driving device of the sub-body.

Therefore, even in a situation in which the sub-body SD is moved downward with respect to the main body MD as shown in FIG. 9 or in a situation such as a turning in which a centrifugal force is applied from the main body MD to the sub-body SD as shown in FIG. 10, oil does not flow back toward the sub-body SD through the return pipe RT, so that an unnecessary increase in oil in the sub-body SD may be prevented.

An oil filter FL is provided at a suction side of the oil pump P, and the return pipe RT is mounted such that oil is capable of being returned to the oil pump P through the oil filter FL.

That is, oil in the sub-body SD is recovered to the oil filter FL through the return pipe RT, and the oil pump P is configured to suction and pump the oil through the oil filter FL.

The supply pipe SP and the return pipe RT are respectively formed of flexible hoses connecting the main body MD and the sub-body SD to each other, so that supply and recovery of oil are capable of being continuously and stably performed even when the relative movement with multiple degrees of freedom of the sub-body SD with respect to the main body MD is performed.

Figure 2:
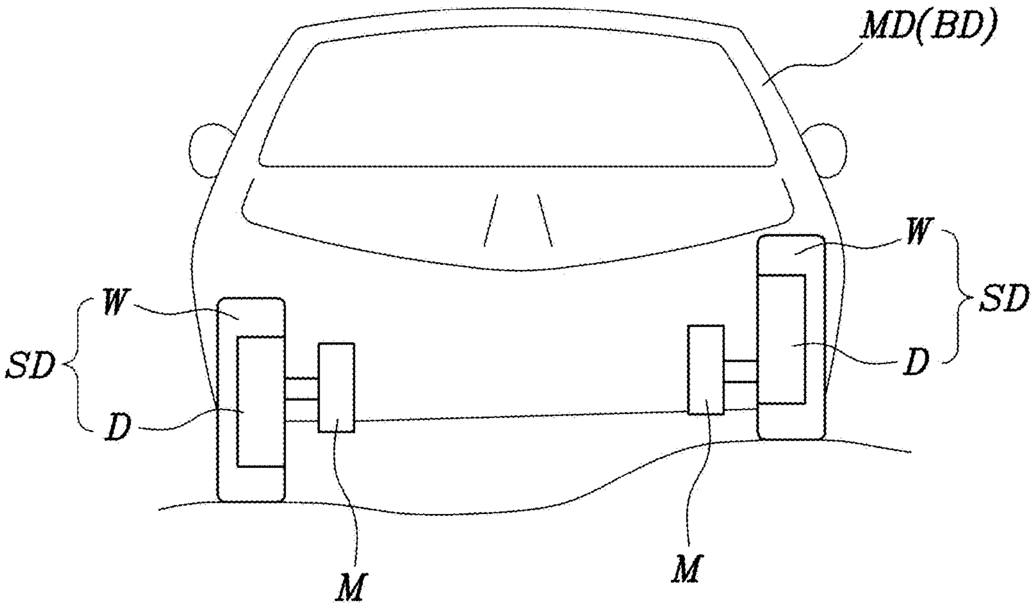
FIG. 2 is a view illustrating a case in which the present disclosure is applied to a vehicle.
Figure 3:
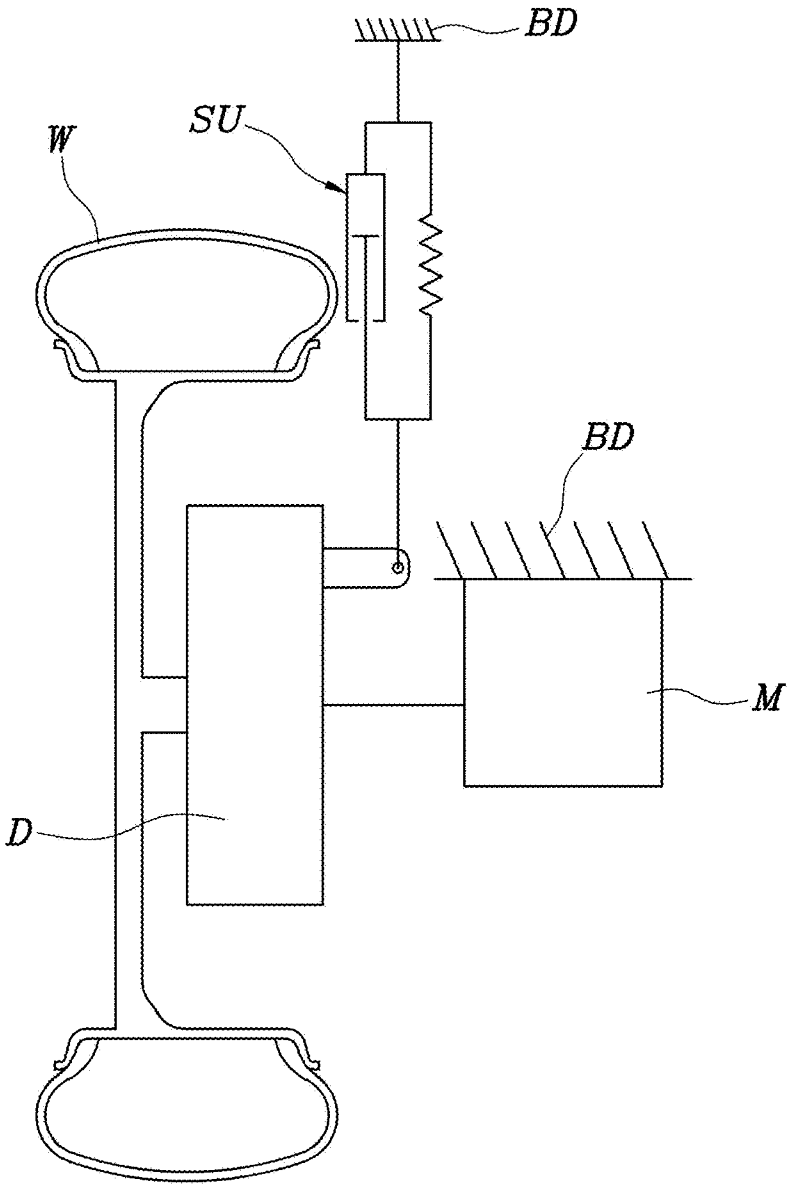
FIG. 3 is a view illustrating a main configuration in FIG. 2 in more detail.

Referring to FIG. 2 and FIG. 3, the main body MD may be a vehicle body BD. Furthermore, the sub-body SD is configured such that the sub-body SD is provided with a wheel W that is configured to be rotated by receiving a rotational force transmitted from the vehicle body BD through the driving device D, and the sub-body may be mounted such that the relative movement with multiple degrees of freedom with respect to the vehicle body BD is capable of being performed through a suspension device SU.

The vehicle body BD, which is the main body MD, is provided with a motor M as a power source that generates a power to be transmitted to the driving device D, and the power may be continuously supplied to the driving device D through an input shaft IN even while the sub-body SD performs the relative movement with multiple degrees of freedom with respect to the main body MD.

At least one of the main body MD and the sub-body SD may be provided with a sensor SN capable of measuring a movement state, and may be provided with a controller CLR configured to perform a control such that the control valve V is opened and oil is supplied to the sub-body SD when the controller CLR receives a signal from the sensor SN and determines that there is a possibility of exposure of the inlet of the return pipe RT to air.

For example, the sensor SN may be configured by combining at least one of an acceleration sensor, an inclination sensor, and a gyro sensor, and the controller CLR may predict whether there is a possibility of exposure of the inlet of the return pipe RT to air on the basis of the signal from the sensor SN and then may control the control valve V so that oil is supplied to the sub-body SD.

Of course, in the situation described above, when there is insufficient oil in the reservoir RV, the controller CLR may drive the oil pump P so as to supply oil to the sub-body SD directly.

In a situation of turning or uphill and downhill driving of the main body MD and the sub-body SD or in a situation in which the sub-body SD is raised to a position where the inlet of the return pipe RT is positioned higher than a position of an outlet of the return pipe RT, the controller CLR may be configured to determine that at least one of the situations as a case in which there is a possibility of exposure of the inlet of the return pipe RT to air.

Figure 5:
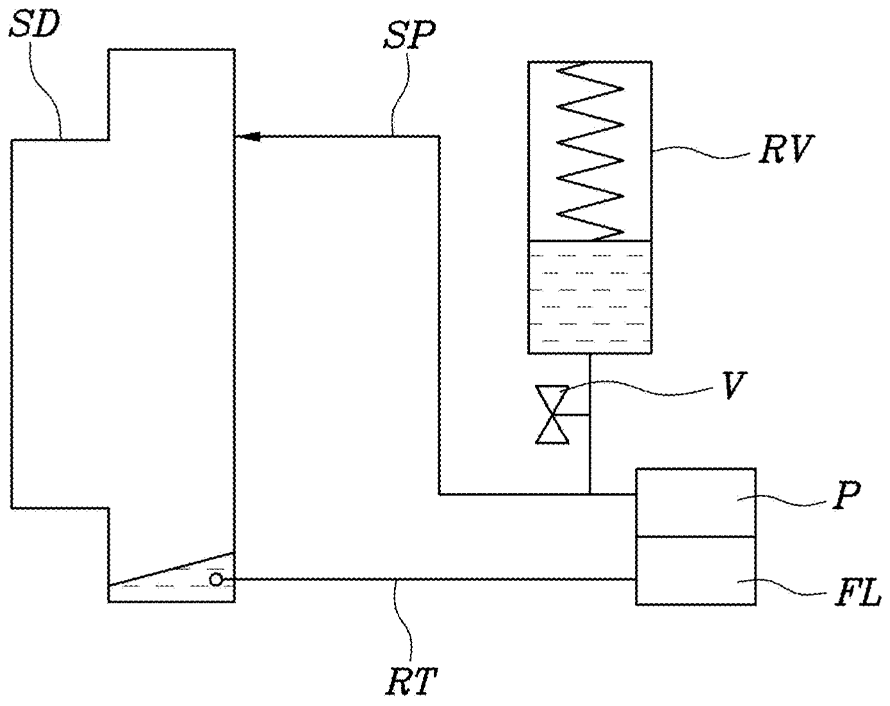
FIG. 5 is a view illustrating a behavior of oil in a sub-body according to turning of the vehicle.

That is, when turning of a vehicle is performed, shifting of oil toward one side occurs in the sub-body SD as illustrated in FIG. 5, and the inlet of the return pipe RT is exposed to air, so that cavitation of the oil pump P may occur and, accordingly, erosion of the oil flow path and noise may occur. Therefore, when such a situation is expected to occur, the controller CLR drives the control valve V or the oil pump P as described above, so that oil is additionally supplied to the sub-body SD, thereby being capable of preventing such a situation.

Figure 6:
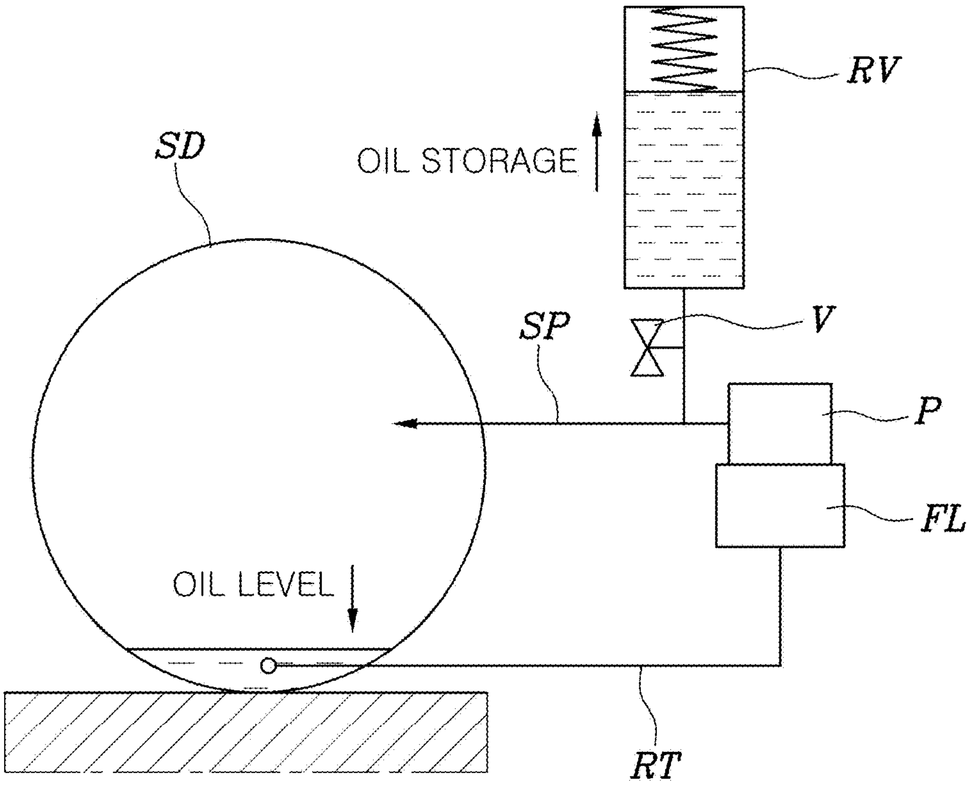
FIG. 6 is a view illustrating storing oil in the reservoir for managing an oil level when the vehicle is driven on a flat surface.

In addition, as illustrated in FIG. 6, in a situation in which the vehicle is driven on a flat surface, the controller CLR opens the control valve V and drives the oil pump P. Therefore, oil is stored in the reservoir RV, and a residual level of the oil in the sub-body SD is minimized, so that the unsprung mass is reduced and the churning loss is reduced.

Figure 7:
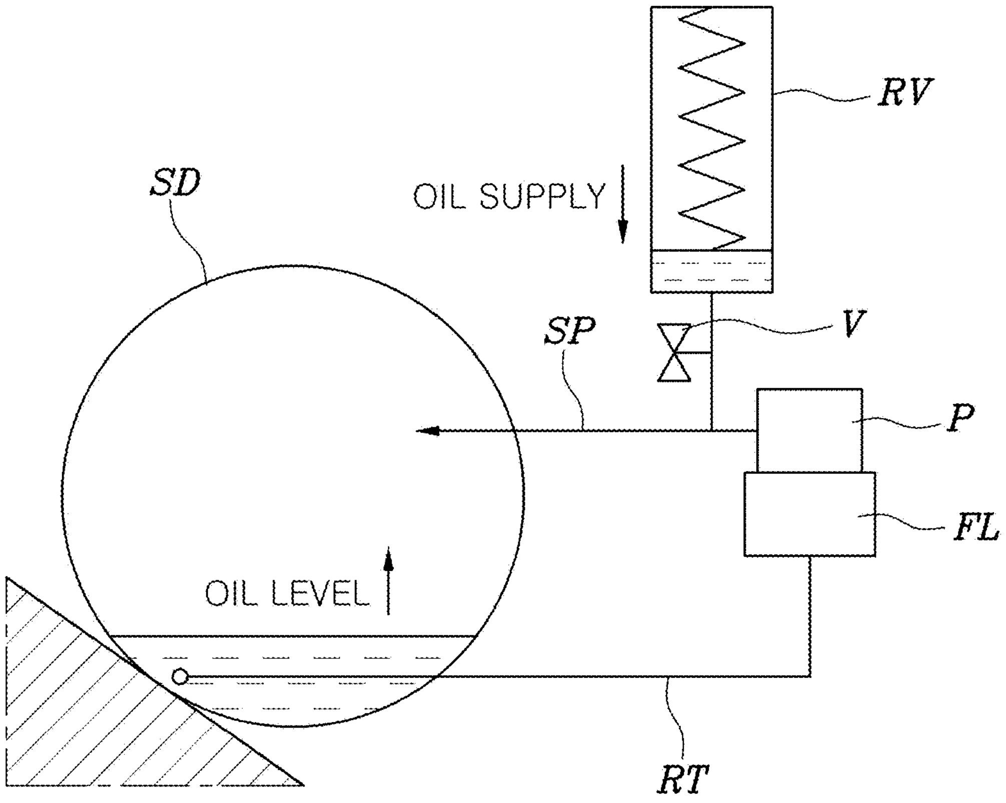
FIG. 7 is a view illustrating increasing a residual amount of oil in the sub-body during uphill and downhill driving of the vehicle, compared to a residual amount of oil in the sub-body in FIG. 6.

Furthermore, as illustrated in FIG. 7, when uphill and downhill driving of the vehicle is performed, the possibility of exposure of the inlet of the return pipe RT to air increases, so that it is preferable that the controller CLR performs a control by using the control valve V or the oil pump P so that the oil level in the sub-body SD is increased.

Figure 8:
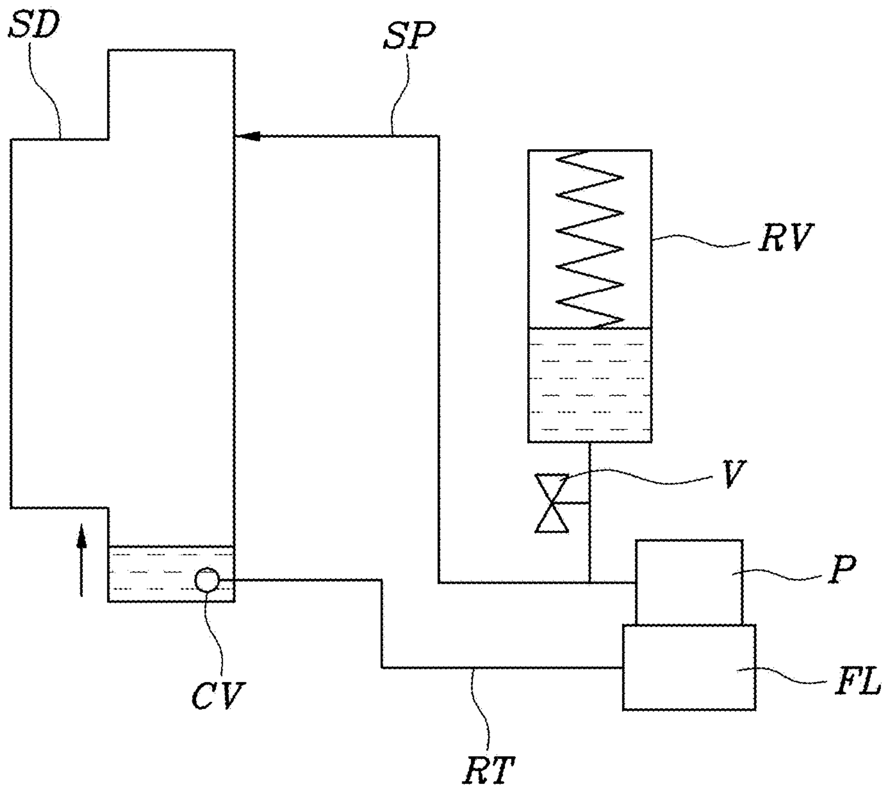
FIG. 8 is a view illustrating a behavior of oil in the sub-body in a situation in which a wheel of the vehicle is raised with respect to a vehicle body.

In addition, as illustrated in FIG. 8, when a situation in which the sub-body SD provided with the wheel is raised with respect to the vehicle body BD and oil in the sub-body SD is moved toward the oil pump P through the return pipe RT by gravity occurs, the possibility of exposure of the inlet of the return pipe RT to air increases, so that the controller CLR drives the control valve V or the oil pump P so that the oil level in the sub-body SD is maintained to a proper level.

The reason why the controller CLR performs the control as described above is to reduce the unsprung mass and the churning loss by maintaining the oil level in the sub-body SD to be in a low level and additionally supplying oil to the sub-body SD when it is required so that a basic oil storing amount of the sub-body SD is lowered.

For reference, as described above, in FIG. 9, it is described that backflow of oil toward the sub-body SD is prevented by the check valve CV even in a situation in which the sub-body SD provided with the wheel W is lowered with respect to the vehicle body BD and oil can be automatically moved from the oil filter FL to the sub-body SD through the return pipe RT by gravity.

In addition, in FIG. 10, it is described that the backflow of oil toward the sub-body SD is prevented by the check valve CV in a situation in which oil can be moved from the oil filter FL to the sub-body SD through the return pipe RT by a centrifugal force when turning of the vehicle body BD is performed.

Referring to FIG. 11 to FIG. 15, the sub-body SD may include a carrier C mounted such that the carrier C is capable of performing a relative movement with multiple degrees of freedom with respect to the vehicle body BD that is the main body MD, the carrier C constituting the driving device D, and the wheel W mounted such that the wheel W is capable of being rotated with respect to the carrier C by a rotational force transmitted from the driving device D.

The driving device D includes a ring gear R which is mounted such that the ring gear R is capable of being rotated with respect to the carrier C and to which the wheel W is connected, a sun gear S configured to receive a rotational force transmitted from the main body MD and mounted such that a distance between a rotation shaft of the sun gear S and a rotation shaft of the ring gear R is capable of being changed, and a gear train 1 provided such that a continuous power transmission state between the sun gear S and the ring gear R is maintained while the gear train 1 allows the change in the distance between the rotation shaft of the sun gear S and the rotation shaft of the ring gear R.

Here, among gears constituting the gear train 1, a rotation shaft of a final gear 3 that is engaged with the ring gear R is supported on the carrier C.

The gear train 1 is provided with a plurality of links configured such that an angle at which the plurality of links is connected to each other is changed according to a relative movement between the rotation shaft of the sun gear S and the rotation shaft of the ring gear R.

The plurality of links includes a first link 5 connected to the rotation shaft of the sun gear S and includes a second link 7 connected to the first link 5. Furthermore, a joint gear 9 which constitutes the gear train 1 and which has the same number of teeth as the sun gear S and the final gear 3 is mounted at a connection portion between the first link 5 and the second link 7.

The gear train 1 includes a first intermediate gear 11 having a rotation shaft supported on the first link 5 such that the first intermediate gear 11 connects the sun gear S and the joint gear 9 to each other, and a second intermediate gear 13 having a rotation shaft supported on the second link 7 such that the second intermediate gear 13 connects the joint gear 9 and the final gear 3 to each other.

As described above, when the sun gear S, the joint gear 9, and the final gear 3 have the same number of teeth, a relative phase of the sun gear S and the ring gear R remains constant with respect to the relative movement of the rotation shafts of the sun gear S and the ring gear R.

Here, the relative phase remains constant for the relative movement of the sun gear S and the ring gear R may be rephrased as that even if the ring gear R is raised or moved left and right with respect to the sun gear S, when the sun gear S does not rotate, the ring gear R does not rotate.

Therefore, the power transmitted from the sun gear S is transmitted to the ring gear R at a constant speed regardless of a change in the shaft distance between the sun gear S and the ring gear R. Therefore, in a situation in which the power generated from the motor M is transmitted to the wheel from the sun gear S through the ring gear R, even when the ring gear R and the wheel are raised up and down or moved left and right with respect to the motor M or the rotation shaft of the sun gear S, the phase of the motor M connected to the sun gear S and the phase of the wheel connected to the ring gear R do not change, so that a driving force of the vehicle is stably controlled by the motor M and stable driving of the vehicle is capable of being performed.

If the condition described above is not satisfied and any one of the sun gear S, the joint gear 9, and the final gear 3 are different in number of teeth, even if the motor M is rotated at a constant speed, relative movements of the ring gear R and the wheel W with respect to the sun gear S and the motor M occurs, and the phase of the sun gear S and the phase of the ring gear R become different from each other and a relative rotation occurs, so that vibration of the vehicle according to a driving direction may occur.

The supply pipe SP and the return pipe RT are mounted such that the supply pipe SP and the return pipe RT are in communication with a space inside a carrier housing 15 that surrounds the carrier C and the ring gear R, a wheel hub 17 to which the wheel W is coupled is spline-coupled to the ring gear R, and the wheel hub 17 is supported on the carrier housing 15 by a wheel bearing 19.

The carrier housing 15 is mounted such that the carrier housing 15 is capable of performing a relative movement with multiple degrees of freedom with respect to the vehicle body BD through the suspension device SU, has an inner portion provided with a storing space SE storing the driving device D, has an outer portion through which the input shaft IN penetrates, the input shaft IN being configured such that the wheel W is supported on the input shaft IN through the wheel hub 17 so that the wheel W is capable of being rotated, and the input shaft IN being configured to receive a power from the motor M of the vehicle body BD that is the main body MD.

The carrier housing 15 is provided with a housing opening 21 that is open such that the relative movement with multiple degrees of freedom of the carrier housing 15 with respect to the vehicle body BD does not interfere with the input shaft IN in a state in which the input shaft IN penetrates the carrier housing 15, and the housing opening 21 is blocked by a sealing member 23 having a bellows structure. Therefore, the inner portion of the storing space SE is formed as a space blocked from the outside, so that oil supplied to the supply pipe SP does not leak to the outside and can be recovered only through the return pipe RT.

Figure 12:
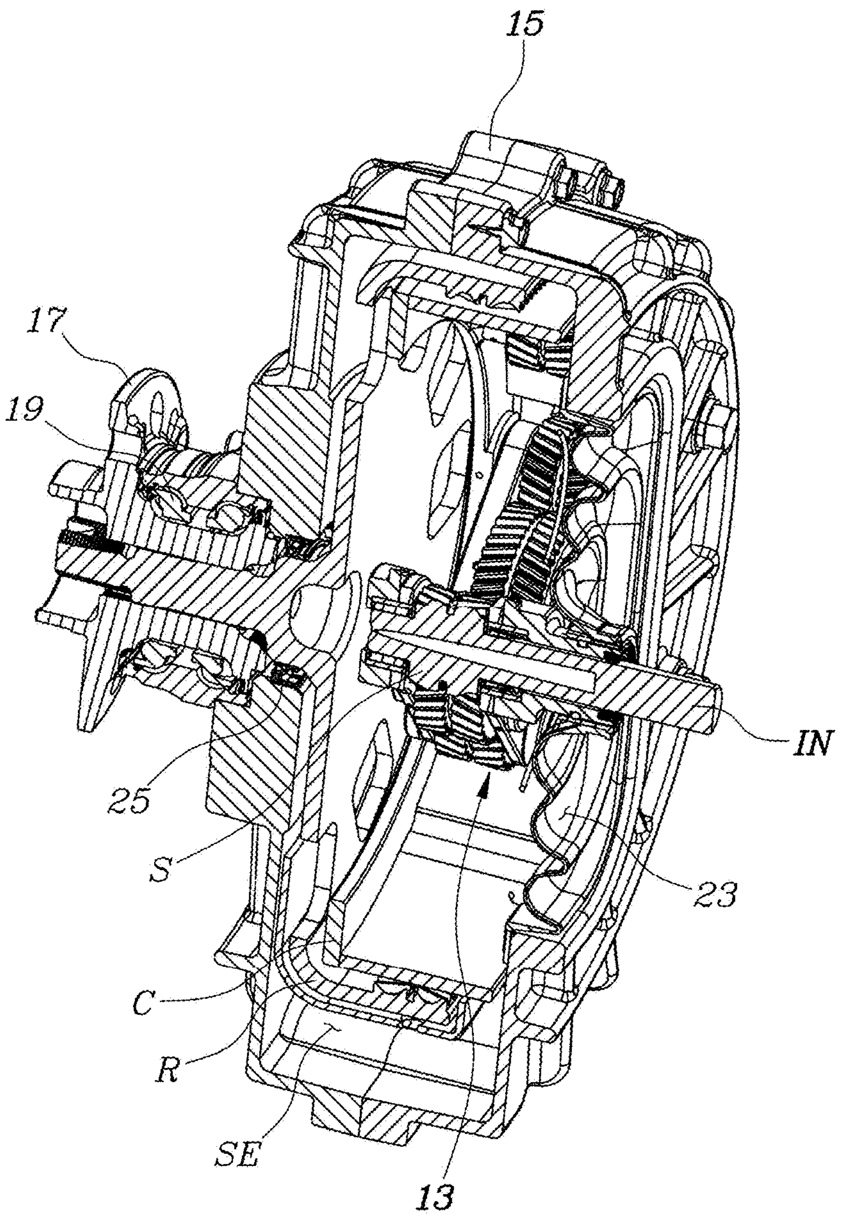
FIG. 12 is a cross-sectional view taken along line F12-F12 in FIG. 11.
Figure 13:
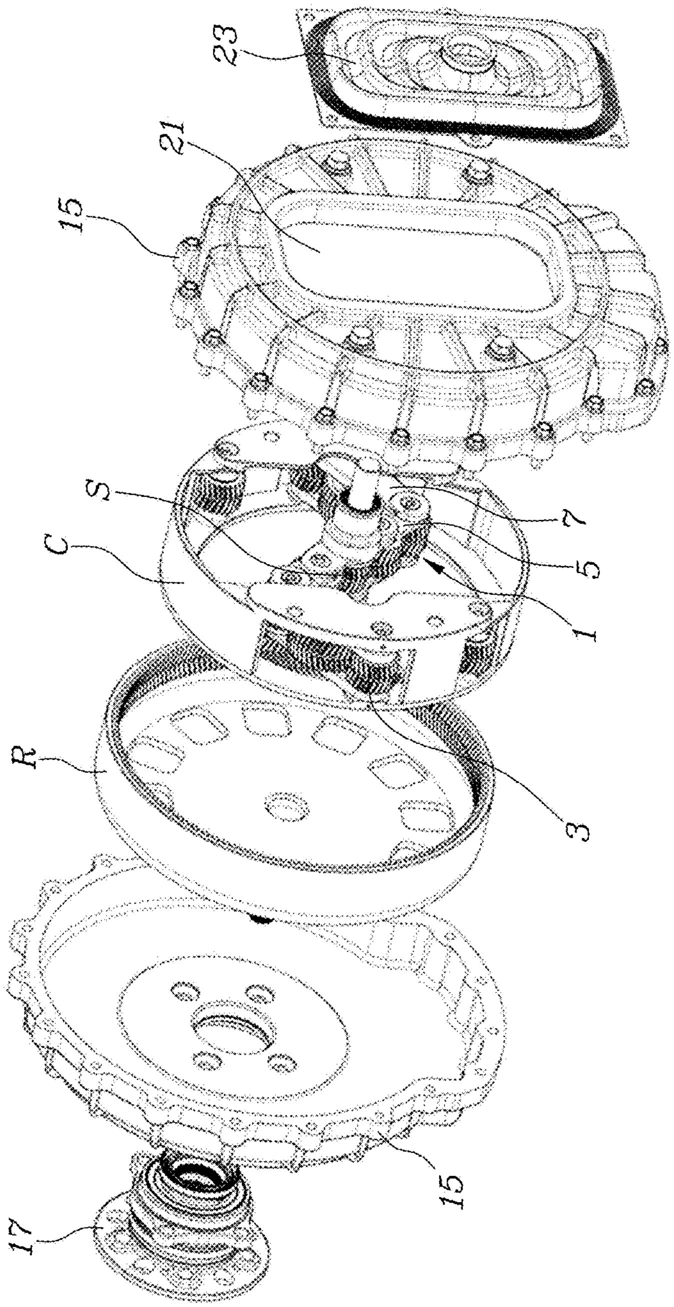
FIG. 13 is an exploded perspective view illustrating the driving device in FIG. 11.
Figure 14:
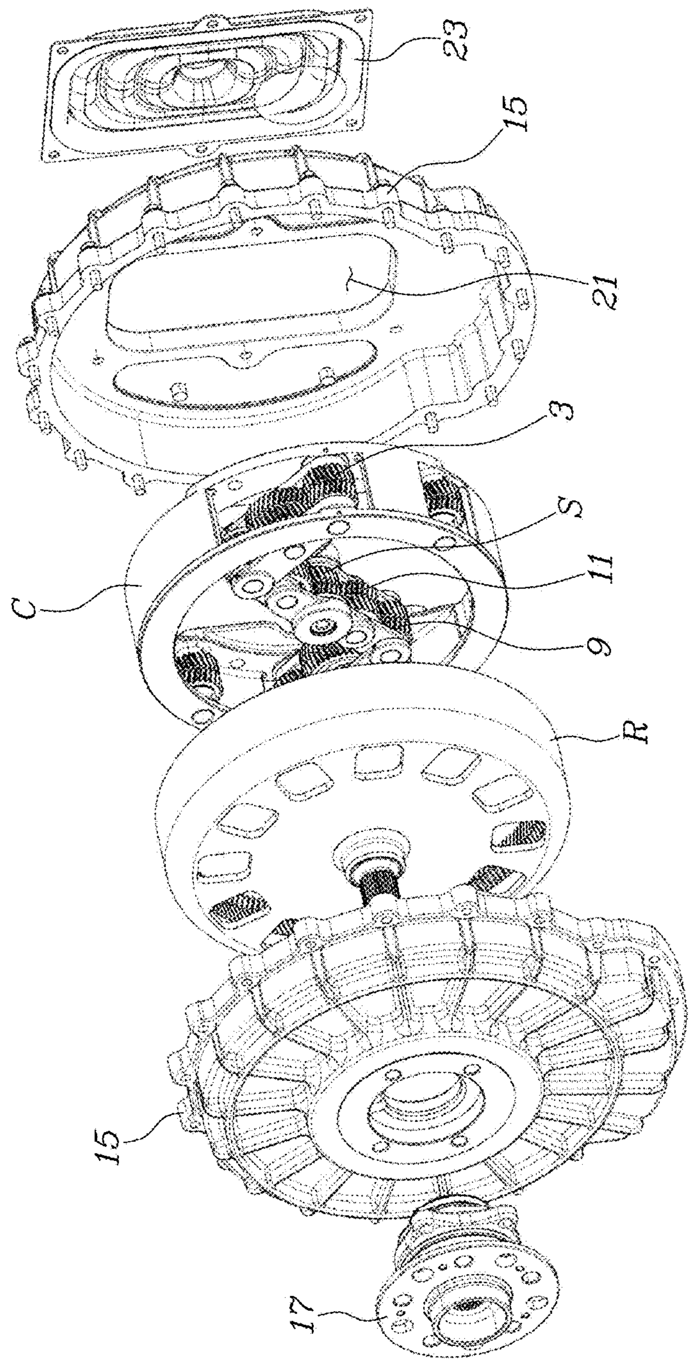
FIG. 14 is an exploded perspective view of the driving device in FIG. 11 observed in an opposite direction of FIG. 13.
Figure 15:
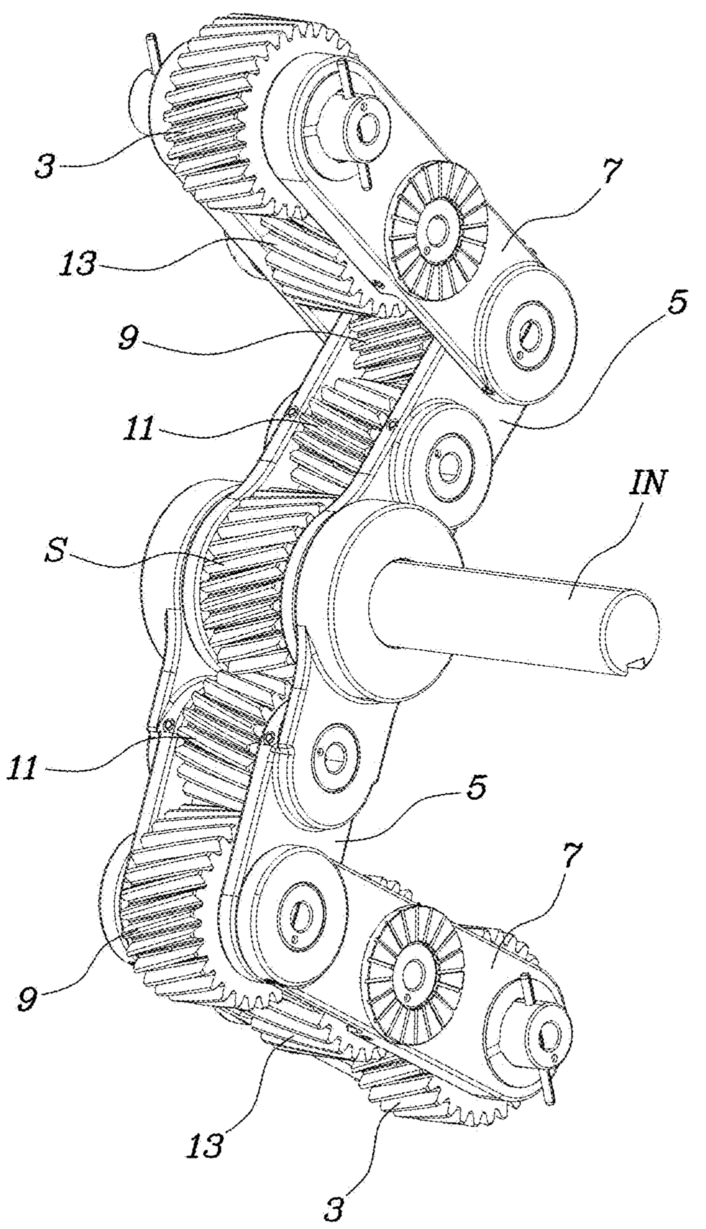
FIG. 15 is a view illustrating a gear train, a first link, and a second link in FIG. 13 in detail.

In FIG. 12 to FIG. 14, although portions where the supply pipe SP and the return pipe RT are connected are not indicated, the supply pipe SP may be connected by penetrating an upper side of the carrier housing 15, and the return pipe RT may be connected by penetrating a lower side of the carrier housing 15.

Meanwhile, a sealing 25 for preventing leakage of oil in the storing space SE may be provided between the carrier housing 15 and the ring gear R.

Although exemplary embodiments of the present disclosure have been described herein, it is understood that the present disclosure should not be limited to these exemplary embodiments and that various changes and modifications can be made by one ordinary skilled in the art within the spirit and scope of the present disclosure.

What is claimed is:

1. A driving device lubrication structure comprising:

a main body;

a power source mounted on the main body and configured to generate a rotational force;

a sub-body spaced apart from the main body and mounted such that the sub-body is capable of performing a relative movement with multiple degrees of freedom including a translational movement with respect to the main body within a predetermined range, the sub-body being configured such that at least a portion of the sub-body is capable of being rotated by a rotational force transmitted from the power source of the main body;

a driving device provided within the sub-body, the driving device being configured to shift the rotational force transmitted from the main body;

an oil pump provided in the main body and configured to supply an oil to the driving device;

a supply pipe mounted to traverse an external space between the main body and the sub-body and configured to undergo shape deformation such that the oil that the oil pump supplies is capable of being supplied to the sub-body while the relative movement of the sub-body with respect to the main body is capable of being performed; and a return pipe mounted to traverse the external space between the main body and the sub-body and configured to undergo shape deformation such that the oil in the sub-body is capable of being returned to the oil pump while the relative movement of the sub-body with respect to the main body is capable of being performed, wherein the supply pipe is mounted to connect the oil pump and the sub-body to each other at a position relatively higher than a position of the return pipe, wherein the main body is provided with a reservoir such that the reservoir is capable of being in communication with the supply pipe, and a control valve capable of controlling a flow of the oil is provided between the reservoir and the supply pipe, and wherein at least one of the main body and the sub-body is provided with: a sensor capable of measuring a movement state; and a controller configured to perform a control such that the control valve is opened and the oil is supplied to the sub-body when the controller receives a signal from the sensor and determines that there is a possibility of exposure of an inlet of the return pipe to air.

2. The driving device lubrication structure of claim 1, wherein a pressure spring is mounted in the reservoir so that pressure is capable of being applied to the oil accommodated in the reservoir.

3. The driving device lubrication structure of claim 1, wherein, in a situation of turning or uphill and downhill driving of the main body and the sub-body or in a situation in which the sub-body is raised to a position where the inlet of the return pipe is positioned higher than a position of an outlet of the return pipe, the controller is configured to determine that at least one of the situations as a case in which there is the possibility of exposure of the inlet of the return pipe to air.

4. The driving device lubrication structure of claim 3, wherein the main body is a vehicle body, the sub-body is mounted such that the sub-body is capable of performing the relative movement with multiple degrees of freedom with respect to the vehicle body through a suspension device, and the sub-body is provided with a wheel that is configured to be rotated by receiving a rotational force transmitted from the vehicle body through the driving device.

5. The driving device lubrication structure of claim 1, wherein a check valve that prevents an oil from flowing back toward the sub-body is provided at an inlet of the return pipe.

6. The driving device lubrication structure of claim 5, wherein the sub-body comprises:

a carrier mounted such that the carrier is capable of performing a relative movement with multiple degrees of freedom with respect to the main body, the carrier constituting the driving device; and a wheel mounted such that the wheel is capable of being rotated with respect to the carrier by a rotational force transmitted from the driving device.

7. The driving device lubrication structure of claim 6, wherein the driving device comprises:

a ring gear which is mounted such that the ring gear is capable of being rotated with respect to the carrier and to which the wheel is connected;

a sun gear configured to receive a rotational force transmitted from the main body and mounted such that a distance between a rotation shaft of the sun gear and a rotation shaft of the ring gear is capable of being changed; and a gear train provided such that a continuous power transmission state between the sun gear and the ring gear is maintained while the gear train allows the change in the distance between the rotation shaft of the sun gear and the rotation shaft of the ring gear, wherein, among gears constituting the gear train, a rotation shaft of a final gear that is engaged with the ring gear is supported on the carrier.

8. The driving device lubrication structure of claim 7, wherein the gear train is provided with a plurality of links configured such that an angle at which the plurality of links is connected to each other is changed according to a relative movement between the rotation shaft of the sun gear and the rotation shaft of the ring gear.

9. The driving device lubrication structure of claim 8, wherein the plurality of links comprises a first link connected to the rotation shaft of the sun gear and includes a second link connected to the first link, and a joint gear which constitutes the gear train and which has a same number of teeth as the sun gear and the final gear is mounted at a connection portion between the first link and the second link.

10. The driving device lubrication structure of claim 9, wherein the gear train comprises:

a first intermediate gear having a rotation shaft supported on the first link such that the first intermediate gear connects the sun gear and the joint gear to each other; and a second intermediate gear having a rotation shaft supported on the second link such that the second intermediate gear connects the joint gear and the final gear to each other.

11. The driving device lubrication structure of claim 7, wherein the supply pipe and the return pipe are mounted such that the supply pipe and the return pipe are in communication with a space inside a carrier housing that surrounds the carrier and the ring gear, and a wheel hub to which the wheel is coupled is spline-coupled to the ring gear, and the wheel hub is supported on the carrier housing by a wheel bearing.

12. The driving device lubrication structure of claim 1, wherein an oil filter is provided at a suction side of the oil pump, and the return pipe is mounted such that oil is capable of being returned to the oil pump through the oil filter.

13. The driving device lubrication structure of claim 1, wherein the supply pipe and the return pipe are respectively formed of flexible hoses connecting the main body and the sub-body to each other.

* * * * *